United States Patent
Bauer

(10) Patent No.: US 6,346,193 B1
(45) Date of Patent: Feb. 12, 2002

(54) METHOD OF AND APPARATUS FOR PROTECTING AND IMPROVING WATER QUALITY IN SUBSTANTIALLY ENCLOSED BODIES OF WATER

(75) Inventor: Raymond A. Bauer, Mystic, CT (US)

(73) Assignee: ECO Boom, Inc., New York Corporation, Glen Head, NY (US)

( * ) Notice: Subject to any disclaimer, the term of this patent is extended or adjusted under 35 U.S.C. 154(b) by 0 days.

(21) Appl. No.: 09/584,421

(22) Filed: Jun. 5, 2000

(51) Int. Cl.$^7$ ................................................. C02F 3/00
(52) U.S. Cl. ...................... 210/615; 210/747; 210/150; 210/170; 405/52; 405/115
(58) Field of Search ................................. 210/150, 170, 210/242.1, 615, 747; 405/36, 50, 52, 115

(56) References Cited

U.S. PATENT DOCUMENTS

| | | | | |
|---|---|---|---|---|
| 4,263,142 A | * | 4/1981 | Burton ........................ | 210/150 |
| 4,298,471 A | * | 11/1981 | Dunkers .................. | 210/242.1 |
| 4,452,548 A | * | 6/1984 | Balogh et al. .............. | 210/170 |
| 4,664,792 A | * | 5/1987 | Fors et al. ..................... | 405/52 |
| 4,695,384 A | * | 9/1987 | Ripl et al. .................... | 210/747 |
| 4,879,046 A | * | 11/1989 | Kojima ........................ | 210/170 |
| 5,011,604 A | * | 4/1991 | Wilde et al. ................. | 210/747 |
| 5,366,322 A | * | 11/1994 | Hurwitt ........................ | 405/52 |
| 5,893,978 A | * | 4/1999 | Yoda et al. .................. | 210/170 |
| 6,142,704 A | * | 11/2000 | Coyne ........................ | 405/115 |

\* cited by examiner

Primary Examiner—Christopher Upton
(74) Attorney, Agent, or Firm—Robert H. Montgomery

(57) ABSTRACT

A method of protecting and improving the quality of water in a body of water which comprises identifying areas of water runoff and/or points of storm water entrance into the body of water and the provision of floating booms to separate a small area(s) of a reservoir where surface and storm water run-off from the water shed or storm water entrance points enter the main body of water. Supported from the booms is a filter curtain of geosynthetic fabric material which is anchored to the floor of the reservoir along the profile of the reservoir floor. The fabric material has small openings in sufficient number to permit passage of a predetermined volume of water per unit time, but small enough to block particulate biodegradable organic particulate matter. The run off or storm discharge contains particulate matter, which is a carrier of microorganisms as small as one micron. The filter curtain prevents passage of the particulate matter and non-organic turbidity causing particles. This greatly concentrates the particulate organic subject matter and provides a concentrated source of nourishment for microorganisms. The microorganisms or bacteria consume and decompose the biodegradable particulate matter thus improving the quality of the run-off or discharge as it passes the filter curtain and enters the main body of water. The microorganisms consume and biodegrade the organic material trapped by the fabric sheet and ultimately perish as the biodegradable organic material is consumed. The results in substantially lowering coliform count and the biodegradable organic matter in the main body of water. The invention is also applicable to the entrance points of streams or brooks which receives surface water run-off and feed into the body of water to be protected.

18 Claims, 5 Drawing Sheets

METHOD OF AND APPARATUS FOR PROTECTING AND IMPROVING WATER QUALITY IN SUBSTANTIALLY ENCLOSED BODIES OF WATER

FIELD OF THE INVENTION

This invention relates to a method of and apparatus for protecting and improving the water quality of substantially enclosed bodies of fresh water such as reservoirs of water to be used as a source of domestic water employing the phenomena of biodegradation to eliminate bacteria.

BACKGROUND OF THE INVENTION

Reservoirs of water to be used for domestic purposes are of small size as compared to large areas of water that may be termed lakes, bays, sounds, etc. The land area surrounding reservoirs are generally termed water shed areas in reference to water run off due to rainfall. Water companies and water supply organizations go to great lengths to protect water shed areas from contaminants that will be carried in rainfall run-off or discharge into a reservoir. In some cases surface water discharge may be from storm drains that collect surface water from a very large area that cannot be managed by a water company. Rain fall and resulting surface storm water run off picks up and carries contaminants including both animal and human fecal matter particulate into a reservoir increasing the coliform count in the water and the turbidity of the water which threatens the quality of water supplied to domestic users. Such storm water also carries non-organic particles into the reservoir.

This has led to the necessity of providing filtration plants for water that is drawn from the reservoir and eventually supplied to domestic users. Additionally, chemical treatment of the water (chlorination) or with disinfectant by products harmful to a few may be necessary to kill bacteria. The cost of filtration plants is very high but they must be used where necessary to meet various standards and regulations applicable to the purity of domestic water. For example, to avoid filtration a public water system that uses surface water sources must have source water quality where the fecal coliform concentration is equal to or less than 20/100 milliliter (ml), or the total coliform concentration must be equal to or less than 100/100 ml in representative samples of the source water immediately prior to the first or only point of disinfectant application in at least ninety percent (90%) of the measurements made in the previous six months that the system served water to the public. In addition the turbidity level cannot exceed five (5) nephelometric turbidity units (NTU) in representative samples of the source water immediately prior to the first or only point of disinfectant application. This standard is known as Criteria for Filtration Avoidance and if not met, the construction and use of filtration facilities is mandated by the Safe Water Drinking Act.

The present invention provides an alternative to the necessity of filtration plants in many instances and at small fractions of the cost of a filtration plant. As hereinafter described in more detail the present invention and/or discovery utilizes a floating boom support for a separator curtain which provides a filter for water run off and discharge into the main body of a reservoir.

The use of floating booms to isolate small bodies of water from or in large bodies of water is well known. A common floating boom structure which has been used for such purposes is shown in U.S. Pat. No. 5,102,261. Such booms or variations thereof may be used in practice of the present invention. The term "boom" is believed to have been first used in logging applications where a series of logs were tied together in a river or large stream to surround other logs and keep them from individually floating away while awaiting transport to a mill. Today the term "boom" is applied to many systems for various purposes, as for example oil spill containment booms.

Booms of the type disclosed in U.S. Pat. No. 5,102,261 have been used for many purposes. Such a boom has also been used to prevent entraining fish in electric generating plant cooling water intakes from river water; to serve as a barrier about dredging operations and to protect areas such as salmon spawning areas from oil spills. Such booms have also been used to block particulate matter and marine life from beach bathing areas. This last mentioned application has resulted in the lowering of coliform in the protected area only by blocking the particulate matter upon which microorganisms are carried, but did not utilize the present invention.

These previously known uses of boom supported filters has been to block particulate matter and/or marine life matter from entering a predetermined area or to confine particulate matter from entering a given area. This is primarily by filtering particulate matter and preventing or reducing turbidity in a boom protected area.

It has now been discovered that sizing a confined area of water hereinafter referred to as a surface water entrance basin, that receives run off or discharge of surface water into a body of water, such as a reservoir, and permitting only a controlled volumetric rate of passage of water from the entrance basin through a filter curtain produces concentration of biodegradable organic material at the filter curtain. The increased microbial density at the filter curtain results in biodegradation of particulate organic matter by the microorganisms carried by such particulate matter. The controlled volumetric rate of passage further inhibits impingement of any particulate matter upon the filter curtain with a force that would tend to hold such particulate matter against and tend to clog the filter openings.

An object of this invention is to provide a new and improved method of and apparatus for reducing the bacteria (coliform) count in water drawn from a reservoir and used for domestic purposes.

Another object of this invention is to provide a new and improved method of and apparatus for improving the water quality of the contents of a reservoir and avoid construction of filtration facilities or upgrading of existing filtration plants.

A further object of this invention is to provide a method of and apparatus for improving the quality of water in a reservoir by confining rain and storm water discharge in a water entrance basin in the reservoir within a floating boom filter and accelerating biodegradation of organic material introduced into a surface water entrance basin at the filter.

SUMMARY OF THE INVENTION

Briefly stated the invention in one form thereof, comprises identifying areas of surface water run-off and/or points of storm water discharge into bodies of fresh water such as a reservoir. Such areas termed surface water entrance basins are delineated by provision of floating booms to separate such surface water entrance basins from the main body of a reservoir. Supported from the booms is a curtain of geosynthetic fabric material that is anchored to the floor of the reservoir along the profile of the reservoir floor. The fabric material has openings of substantially twenty (20)

microns as determined by particle size analysis in water. The run off contains organic particulate matter that is a carrier of microorganisms as small as one micron. The filtering nature of the sheet fabric prevents passage of the particulate matter and turbidity causing particles. This greatly concentrates organic and fecal particulate matter and microbial density increases. The concentrated organic matter provides a source of nourishment for the microorganisms. The microorganisms or bacteria feed upon and decompose the biodegradable organic particulate matter into its constituents, primarily releasing carbon dioxide thus and clarifying the ground surface water run-off before it enters the main body of water. The concentration of microorganisms consume and biodegrade the organic material trapped by the fabric sheet and ultimately expire as the biodegradable organic matter is consumed. This biodegradation is caused by controlling the rate of flow through the filter fabric thus concentrating the particulate organic matter at the filter fabric. The microorganisms multiply with the concentration of food and consume the organic matter. As the food supply diminishes, the microorganisms expire and become sediment. These results in eliminating or substantially lowering the bacteria count in the main body of water due to entrance of surface water and/or storm water discharge. The low flow rate through the filter causes particulate matter striking the filter to fall off rather than remain on the filter curtain and clog the openings. The invention is also applicable to the entrance points of streams or brooks that have received surface water run-off and which feed into the body of water to be protected.

The invention is particularly pointed out and distinctly claimed in the concluding portion of this specification. The invention, however, together with further objects and advantages thereof may be best appreciated by reference to the following detailed description taken in conjunction with the drawings.

DETAILED DESCRIPTION OF PREFERRED EMBODIMENTS OF THE INVENTION

As used hereinafter, the term "surface water entrance basin" or "entrance basin" of water refers to areas of surface ground water run off, storm water discharge points as from a storm drain discharge and/or entrance of tributaries such as brooks or streams as hereinafter defined in more detail. Water usually enters a reservoir from such water entrances and by direct rainfall. Water entering the reservoir from tributaries, storm drains and the general water shed about the reservoir carries with it particulate matter including fecal matter and microorganisms that degrade the water quality.

Figure 1:
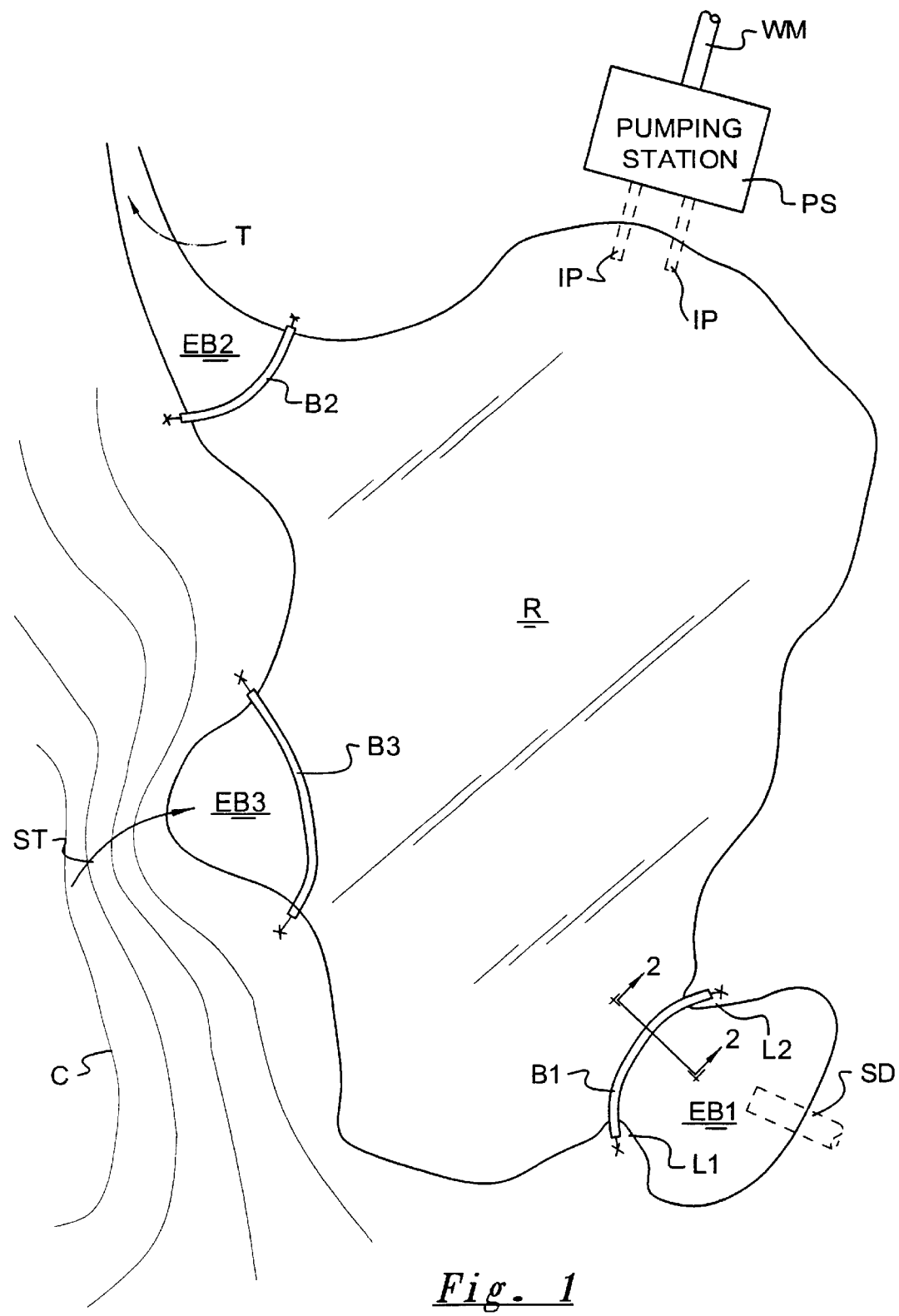
FIG. 1 is a plan view of a reservoir showing booms used in accordance with the invention positioned to define surface water entrance basins at major surface water entrance, discharge points or other areas into the reservoir.

A reservoir R as shown in FIG. 1, has concentrated ground surface water entrances at a storm drain SD, a tributary T, such as a stream, and also an area of steep surrounding topography ST. The entire water shed about the reservoir also provides water run-off during a rain storm. However, for purposes of disclosure of the invention, only the points or areas where there is concentrated entrance of ground surface water to the reservoir during a rainstorm are considered. Direct rainfall into a reservoir generally poses no threat to the quality of water in the reservoir Additionally, all water companies and water authorities own or control and environmentally protect the water shed around their reservoirs. The water entering the reservoir R may be the greatest at the storm drain SD during and immediately after a rain storm. The water entering from the storm drain SD will carry with it particulate matter including non-organic and organic particles that carry microorganisms from the area served by the storm drain. Such particulate matter may be fecal matter, both animal and human, as well as any other particulate matter on the surface of the area served by the storm drain.

The water from the tributary T will carry ground water run-off from a rainstorm as well as any thing introduced at its source and along its route from farm and/or urban, suburban and other potential polluting areas. Such run-off will carry particulate matter including biodegradable organic materials.

Water from the area ST will be water shed run-off and any particulate matter carried by such run-off and such run-off will be concentrated due to the steep topography.

Such water entrances produce increased turbidity of the water in the reservoir R and increase the coliform count (micro organisms per 100 milliliters) of the water in the reservoir.

Such water entrances discharge areas as delineated by a boom are hereinafter termed "surface water entrance basins" or "entrance basins". These quoted terms refer to the area in the body of water R in the immediate vicinity of a water entrance point or area where the incoming discharge and/or run-off begins to disperse into the main body of water. The entrance basins will be generally defined by a floating boom B1, B2 and B3 as hereinafter discussed. The boom length of the perimeter of an entrance basin will be determined by the severity of a periodic storm, that is the run-off or discharge caused by the storm, and accordingly the filtering rate of a filter curtain and the required area of curtain in view of the discharge into the water entrance basin.

The severity of a storm is generally classified as the maximum continuous rainfall that may occur in a given period of time, usually twenty-four hours, for a given geographical area. For example, a twenty-five year storm is one of a severity that is expected to occur once every twenty-five years. Otherwise stated, there is a probability of one in twenty-five of such a storm occurring in any year.

A pumping station PS draws water from the reservoir R through one or more intake pipes IP and supplies water through one or more water mains WM and connecting piping to residences for domestic use and to other water users.

The invention is shown as practiced through the provision of floating booms B1, B2 and B3 about the water entrance points SD, T and ST respectively. The booms B1, B2 and B3 define the perimeters of surface water entrance basins EB1, EB2 and EB3, respectively. The area of the entrance basins is always a small percentage of the are of the reservoir.

Figure 2:
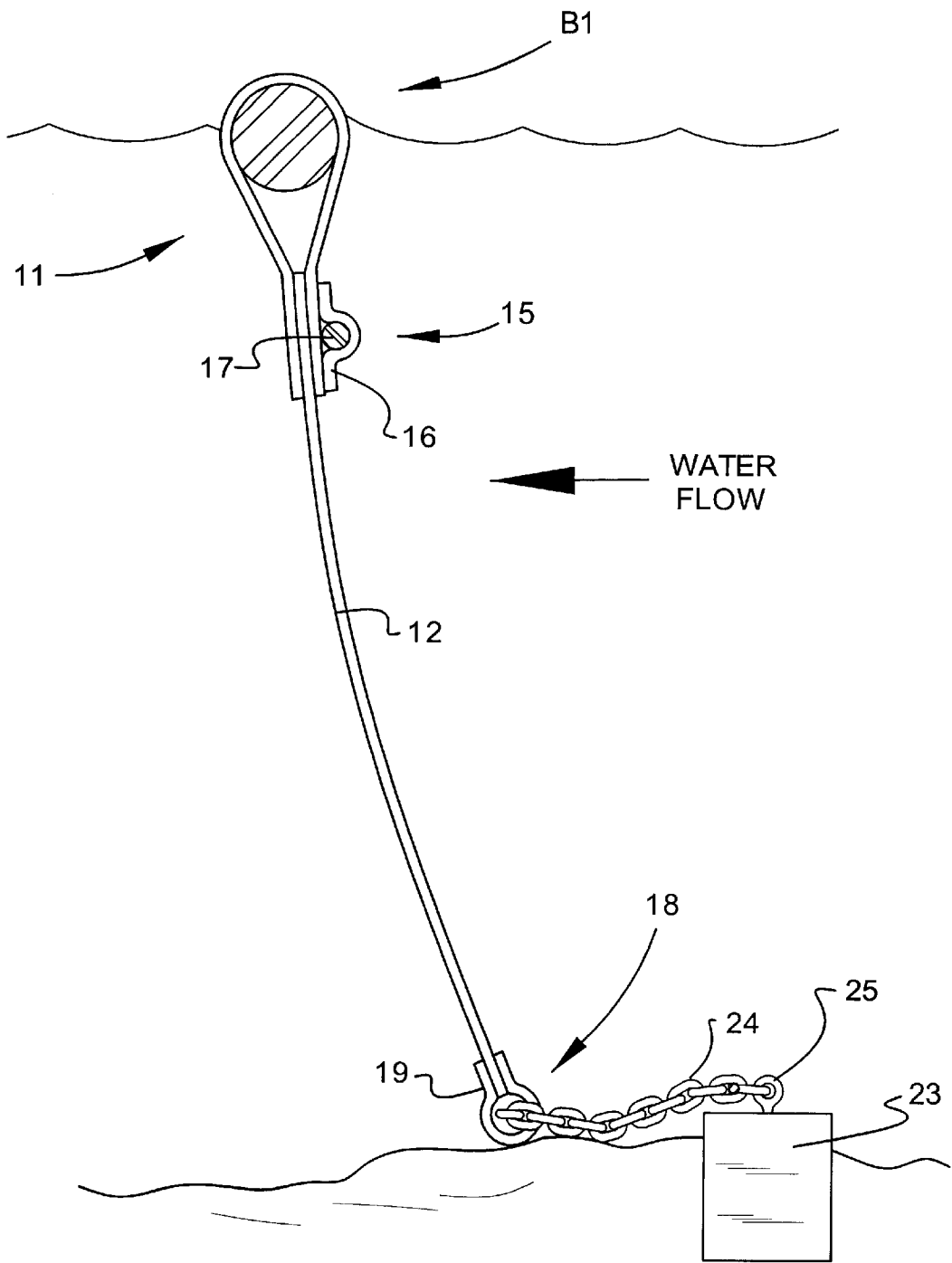
FIG. 2 is a cross sectional view of a boom seen in the plane of lines 2—2 of FIG. 1.

Reference is now made to FIG. 2, which shows a section through boom B1. The booms B1, B2, and B3 comprise a hood portion 11 and a curtain portion 12. The booms are constructed of continuous lengths of sheets of a flexible non-woven geosynthetic fabric. The term "geosynthetic fabric" refers to a water-pervious sheet of plastic fibers, filaments or yarns that have been formed into a stable network such that the fibers filaments or yarns retain their relative position to each other. Suitable fabrics are available from Amoco Filters and Fabrics of Greenville, S.C. and designated by Amoco as 4512, 4514 and 4516, as well as other vendors. Such fabrics provide filter openings of substantially twenty (20) microns, as measured by particle size analysis and in accordance with the invention are constructed to present a filter area which permits passage of only a predetermined volume of water per unit time as hereinafter explained.

Each boom comprises a floatation means, a means for securing the ends of the boom to opposite shore points, at least one continuous filter curtain filter fabric, a lower ballast to maintain the bottom of the curtain on the water bed floor and means for anchoring the curtain to the water bed floor.

The floatation means comprises lengths of expanded plastic billets 13 captured within hood portion 11. Hood portion 11 has openings 14 (FIG. 3) along its length to permit insertion of the plastic billets 13 on site prior to floatation. A common practice is to space the openings 14 every forty feet and insert five-eight foot sections of floatation billets into each opening 14 as the booms are pulled into the water. Eyelets 14a are provided on either side of opening 14 to permit the edges defining openings 14 to be drawn together by mcord or strapping after the billets are installed. The floatation billets may be up in any convenient length and may take any cross sectional configuration. The distance between the openings 14 will be a multiple of the length of the floatation billets. As shown, billets 13 are round. Hood 11 may be formed by doubling over a length of the fabric and stitching it to curtain 12 along the upper edge thereof. A first sleeve 15 is provided near the juncture of hood 11 and curtain 12 as by stitching a narrow length of fabric 16 to hood 11 and/or curtain 12 along its edges. Sleeve 15 receives a length of strong plastic cable 17 therethrough that is utilized to anchor the ends of the boom to shore points. An alternate anchoring construction is to construct a strap or cable of non-metallic material stitched to hood 11 and/or curtain 12 adjacent their juncture. Also, the hood 11 and sleeve 15 may be formed from a continuation of the curtain portion A second sleeve 18 is provided along the bottom edge of filter curtain 12. The second sleeve may be formed, as shown, by a separate length of fabric 19 folded over and stitched to the bottom edge of curtain 12. Alternatively, the second sleeve may be provided by rolling over the bottom edge of curtain 12 and stitching it to itself. The filter curtain may comprise more than one sheets of material and the ultimate construction will be that which lends itself easiest to fabrication.

Figure 3:
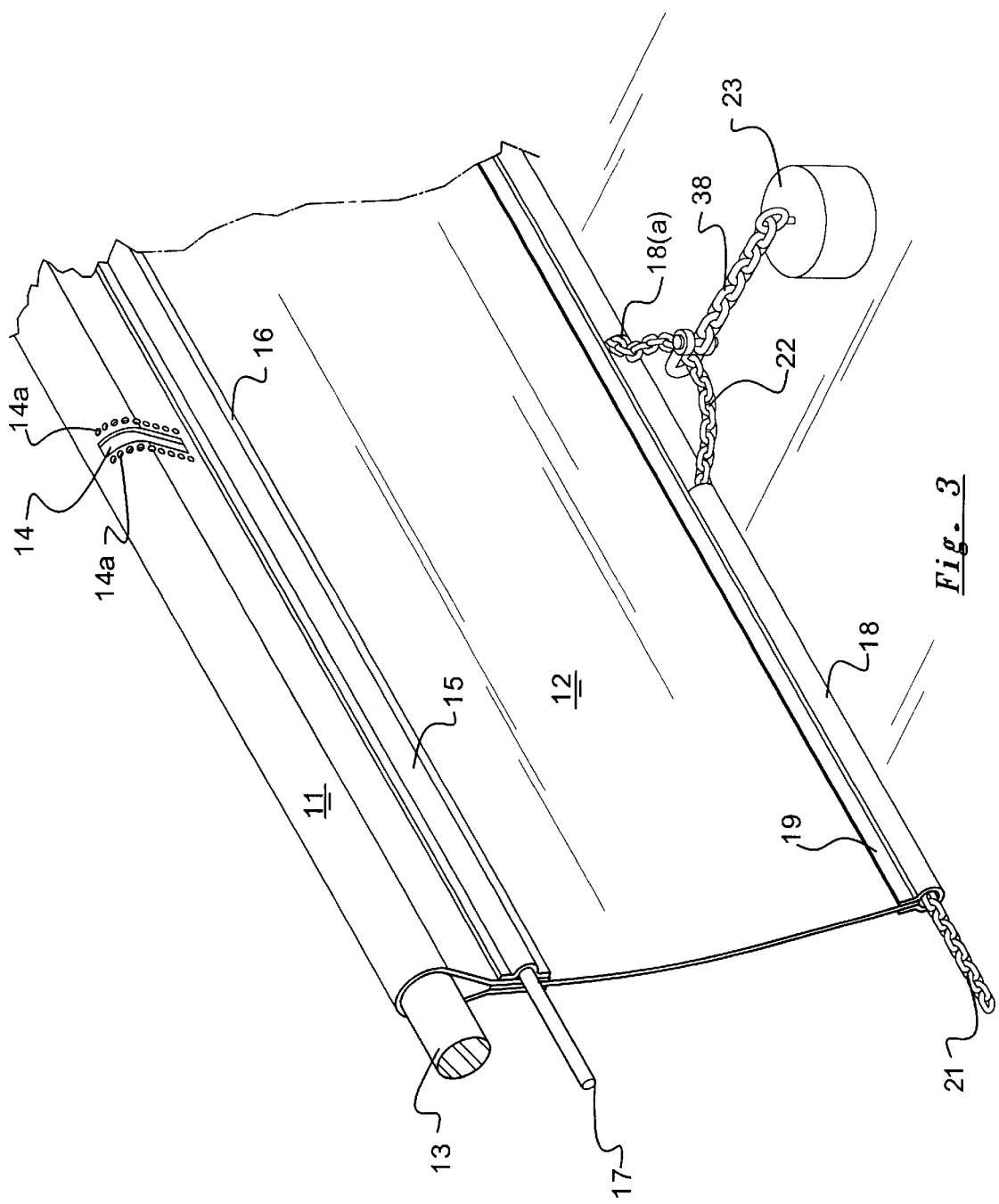
FIG. 3 is a perspective of a section of the boom seen in the plane of lines 3—3 of FIG. 1.

A ballast and anchoring means in the form of a chain 21 is received in sleeve 18. The chain is of sufficient size to weight the bottom of the curtain on the water bed floor, and also provides a means of anchoring the curtain. Sleeve 18, as shown in FIG. 3 has interruptions 18a therein which permit exiting of a length 22 of chain 21 from sleeve 18 at predetermined intervals along the length of sleeve 18. The length of chain 22 may be directly connected to an anchoring pier 23 on or embedded in the water bed floor as shown in FIG. 2, or a separate length of chain 38 may be connected between pier 23 and ballast chain 22. Pier 23 usually comprises a block of concrete 24 of predetermined weight having an attachment eye 25 embedded therein and extending therefrom. Ballast chain 22 is preferably secured adjacent the edges of interruptions 18a to the material of sleeve 18 to prevent slippage of chain 22 in sleeve 21 and resultant fraying or wear. Such securing may be by tying links of chain 22 to eyelets defined in sleeve 18.

Figure 4:
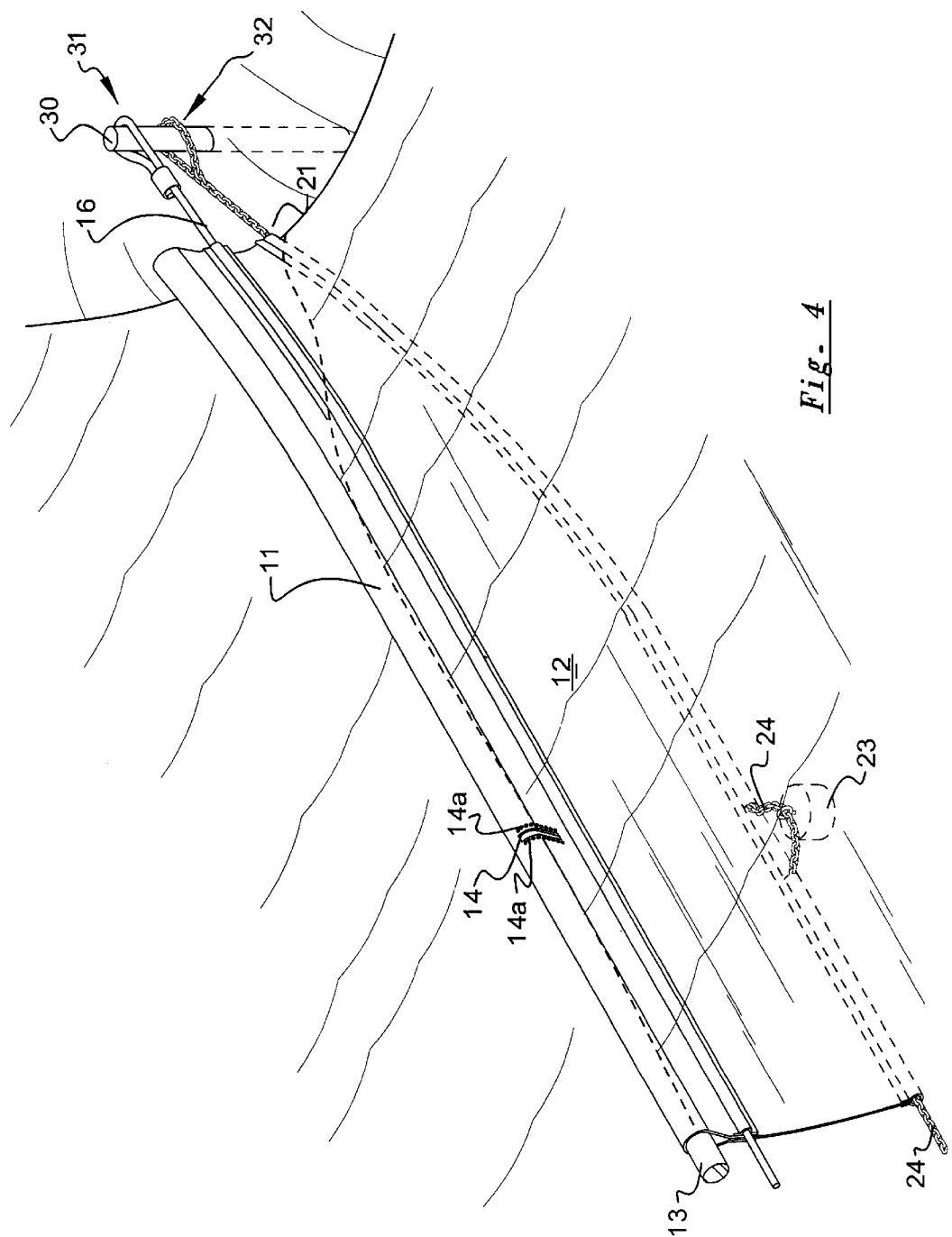
FIG. 4 is a diagram showing the manner in which a boom is anchored to a shore point at one end thereof.

FIG. 4 exemplifies the anchoring of one end of a boom to a shore point. A pier 30 is anchored in land adjacent the water edge. Cable 16 is looped and secured to itself, as identified by the reference numeral 31. A loop 32 is also defined in an end of ballast chain 21 and secured to pier 30.

The piers are sized in weight in accordance with the forces that will be exerted thereon by surface water run-off during a storm of predetermined severity, as is hereinafter explained. The same is true for the weight of the ballast chain 21 and the strength of curtain 12.

A boom as described or booms similar thereto may be fabricated to specification from one of several boom manufacturers including Plastic Fusion Fabricators of Huntsville, Ala., TolPlast Co. of Lacey Springs, Ala., A. H. Harris & Sons of New Britain, Connecticut and Bradley Industrial Textiles of Valpraiso, Fla. The floatation billets in any specified form may be obtained from Branch River Foam and Plastics of Smithfield, R.I. For ease of assembly prior to installation of a boom, billets of eight to ten feet in length are preferred.

The openings in filter curtain 12 are of a size which will trap biodegradable organic particles as well as other particulate matter but permit passage of only a predetermined volume of water per unit time. This results in an accumulation and greatly increased concentration of biodegradable organic particulate material and microbial density at the curtain and adjacent thereto. The microorganisms on the organic particles feed upon the concentrated organic particles and multiply. As the supply of organic materials diminishes due to such biodegradation, the microorganisms, which are left without any nourishment, will become sediment and perish.

In practicing the invention as applied to a reservoir, the points or areas of major storm water entrance into the reservoir are identified. Then the flow rate of storm water discharge or run-off into the entrance basins are determined using the data of a periodic storm, i.e. a twenty-five (25) or fifty (50) year storm. This is historic data which is known and of record with every reservoir. The necessary area and volume of the corresponding surface water entrance basin DB is determined. With the flow rate into the entrance basin determined, the square foot area of filter material required to pass this flow per unit time can be calculated. A bathymetric survey is then made around the perimeter of a determined entrance basin to determine water depths around the entrance basin. A boom is then designed having the required curtain area to pass no more than one cubic foot of water per square foot per minute in view of the flow rate into the entrance basin. Preferably, the permitted flow rate is as small as possible consistent with economy. The flow rate will be selected to a large extent on the peak flow rate at a ground surface water entrance point or area during a storm of predetermined intensity, such as a twenty-five year storm.

Figure 5:
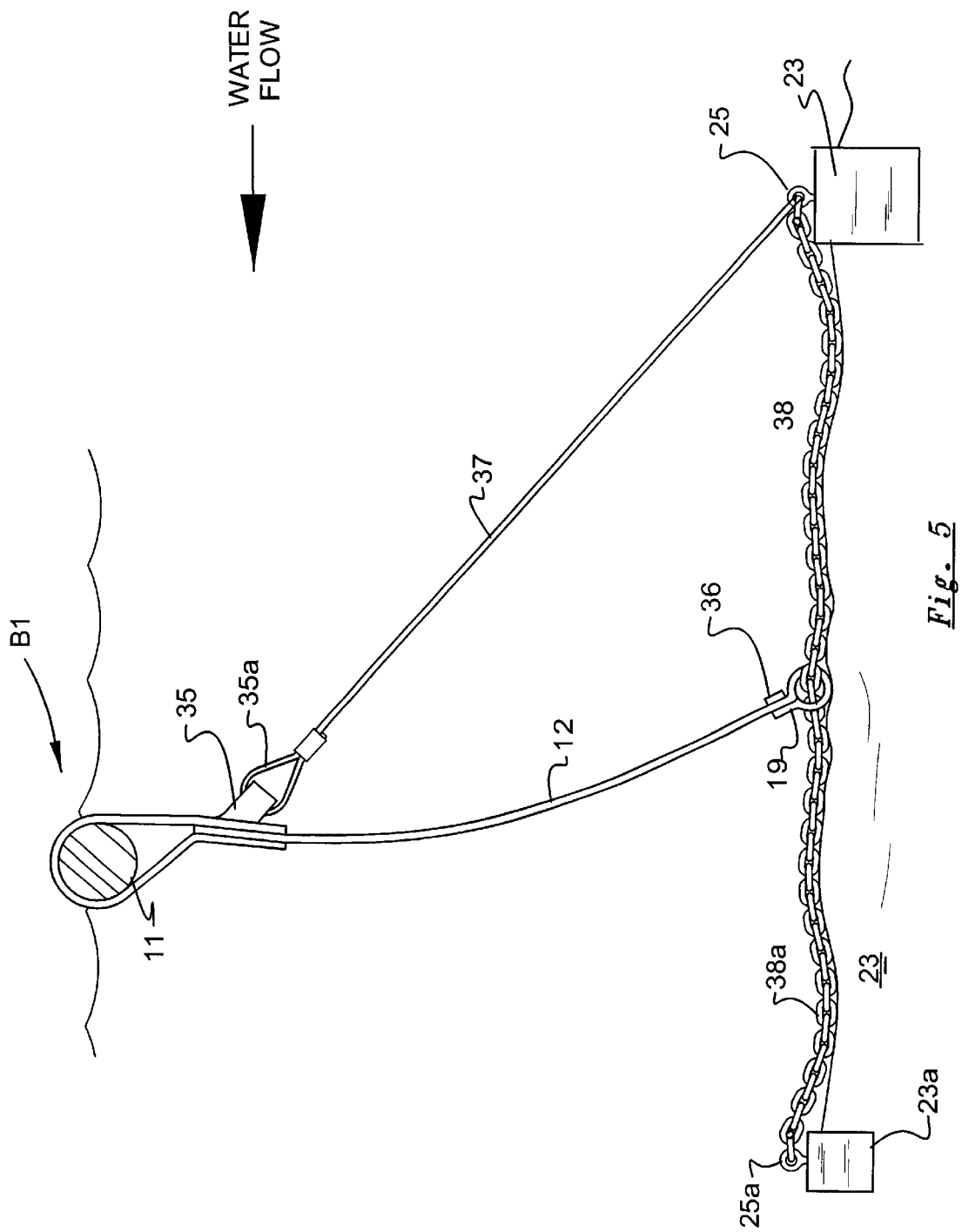
FIG. 5 is a view similar to FIG. 2, but illustrating another technique of fabricating the boom and anchoring thereof.

The boom is then fabricated with an in water area to pass the determined water flow. The length of the boom may be varied to provide the necessary filter area. If necessary because of the length of the perimeter about the discharge basin in relation to the discharge rate, the curtain 12 may be made with a predetermined area or areas that are impervious to flow of water in order to have the correct filter area for the length of boom. In determining the vertical dimension of the curtain 12, the high water level of the reservoir or other body of water is taken into account at the time the bathymetric survey is made. Additional vertical dimension will be added to the boom in view of the expected billowing of the boom as shown in FIG. 5 due to the force of entrance of water into an entrance basin DB.

The fabricated boom is delivered to the site and the floatation billets 13 are installed. Previously, the anchor piers have been installed in accordance with the bathymetric survey, around the perimeter of a surface water entrance basin DB. The boom is then transported to the area of the discharge basin, usually by towing from an initial floatation water entrance point, if the discharge basin is not directly accessible. Sections 22 of ballast chain 21 are connected to the anchor piers. The section of chain 22 shown in FIG. 3 is exaggerated for purposes of illustration. Only one or two links of chain may be exposed in an opening 18a to receive the shackle on the end of chain 38. The ends of cable 16 are secured to shore located piers 30 as shown in FIG. 4. The boom system is now operative for its intended purpose. The piers will vary in weight dependent as determined by forces exerted on a curtain by a storm of predetermined severity. The piers 23 may be as little as five hundred pounds and increase in weight as necessary, as hereinafter pointed out. There is no limitation on the length of a boom.

The retraining force (weight) exerted by the anchor piers is selected to be one at least one pound for every square foot of filter curtain in the water. The anchor piers may be twenty to one hundred feet apart with smaller incremental distances preferred for substantially uniform distribution of restraining force. The smaller incremental distances between anchor piers will be used in greater depths of water. As a safety factor, the calculated weight of the anchor piers is preferably doubled.

An experimental boom that was later determined to practice the invention was made at a reservoir which received storm water discharge from an airport, where the storm water discharge was from two three by five foot storm drain pipes, as exemplified by SD in FIG. 1. Such installation used a boom that arced slightly beyond a six hundred-foot dimension between land anchor piers, as exemplified by pier 30 in FIG. 4. Actually, the ends of the boom were anchored to trees. The filter curtain 12 was anchored by piers 23 along the water bed floor at depths ranging from three feet to twenty-two feet. The ballast chain maintained the lower contoured edge of filter curtain 12 on the water bed floor throughout its length. The filter curtain permitted water flow therethrough at a rate of less than one cubic foot per minute per square foot.

Results to date have shown an eighty to ninety-five percent of fecal coliform reduction while also reducing turbidity in water outside of the boom. Results of operation of this boom are continuing to be studied. This boom continues to be considered experimental.

In determining the height of the boom with respect to the water bed floor, the expected maximum depth of the water must be taken into consideration together with the measurements made during the bathymetric survey. The vertical dimensions are to the bottom of the hood 15 where it is joined to the curtain 12 Reference is made to FIG. 5. FIG. 5 exemplifies a boom during a condition when the reservoir is full and storm water is discharging into the entrance basin that the boom defines. The filter curtain will be stretched to its full extent and billowed by the entering water. FIG. 5 also exemplifies alternate techniques of fabricating the boom and of anchoring the boom.

In FIG. 5, the hood 11 of the boom is formed merely by folding the upper end of the curtain material over on itself to form hood 11. The boom is further fabricated with a reinforcing strap 35 secured thereto along the juncture of the curtain forming hood 11. The strap may be a length of strong material such as seat belt strapping and have loops 35a defined therein spaced along the length of the boom in accordance with the positioning of anchor piers 23. The loops 35a provide securing points for strong plastic ropes 37, such as polypropylene, that are secured at their other ends to anchor piers 23. Anchor piers 23a may be provided on the outside of the boom and connected to ballast chain 20 to help maintain ballast chain 20 centered between anchor piers 23 and 23a. The rope 37 more evenly distributes the restraining forces on the boom and restrains the upper floatation assembly, i.e. the hood and flotation billets.

The use of anchor piers 23a on the outside of a defined entrance basin is optional. This construction is utilized, as may be necessary, to prevent lateral movement of the ballast chain and lower sleeve along the water bed floor. The use of restraint on both sides of the boom tends to center the boom between the anchor piers during quiescent conditions. Thus when the reservoir is low, there will little tendency for the lower portion of curtain 12 to lay spread on the water bed floor and possibly become weighted down with silt and sediment whose weight would hold the boom down when the water level began to rise. The anchor piers 23a do not have to react as large a force as the anchor piers 23 and thus, when used are selected to be one-half the weight of anchor piers 23. As long as the ballast chain remains centered, when the water level falls during quiescent conditions the curtain will tend to fold down in accordion fashion rather than the lower portion lay on the waterbed floor.

Four observations have been made of a boom, designed in accordance with the invention, producing biodegradation of organic material in the entrance basin EB behind the boom. This was in a location where the following periodic storms produce the indicated rainfall in a twenty-four hour period:

| Rain Event Period | Rainfall |
| --- | --- |
| 2 year | 3.30" |
| 5 year | 4.30" |
| 10 | 5.75" |
| 25 year | 6.00" |
| 50 year | 7.00" |
| 100 year | 8.00" |

These statistics were derived from the National Climatic Data Center

A rainfall of twelve inches (12.0") in a twenty-four hour period produced an estimated discharge into an entrance basin such as DB1 of FIG. 1 of at least 100,000 gallons per/minute (13,337 cubic feet/ minute, at least). The water in the entrance basin DB1 was very milky and completely opaque the following day. The water outside of the boom was very clear Two days later the water in the entrance basin DB1 was equally clear as the water outside of the boom. The turbidity inside the boom was estimated to be 30 NTU. At the pumping station PS that was one thousand feet away the turbidity was 0.3 NTU. The coliform count inside the boom was estimated to be >2400 inside the boom and five (5) in the reservoir side (outside the boom). The measure of total suspended solids inside of the boom was 9.9 milligrams per liter and on the reservoir side 0.7 milligrams per liter.

This rain event was highly unusual and according to records of the national Climatic Weather Data Center was greater than a one hundred year storm. The hurricane that struck New England in 1938 produced a rainfall of 12.0 inches in a twenty-four hour period.

A rainfall of 1.80 inches in a twenty-four hour period produced an estimated discharge of storm water into the entrance basin of 25,000 gallons per minute (3342 cubic feet per minute). The water in the entrance basin was moderately milky the following day. Two days after the rain event the water in the entrance basin was clear. The term "moderately" is used to denote that the water was not completely opaque. The turbidity at the pumping station was 0.8 NTU both before and after the rain event and the fecal coliform count was two (2) on the day of the rain event and five (5) two days later.

A rainfall of 1.23 inches in a twenty-four hour period produced an estimated 10,000 gallons per minute (1337 cubic feet per minute) discharge of water into the entrance basin. The day of the rain event and the day after the water inside the boom was slightly milky and two days later it was clear. The term "slightly" is used to denote that while the water appeared to be milky some depth of the water was observed. The turbidity at the pumping station was 0.7 NTU on both days. The fecal coliform count was two (2) on both days.

A rainfall of 1.39 inches in a twenty-four hour period produced an estimated 20,000 gallons per minute (2674 cubic feet per minute) discharge of storm water into the entrance basin. The day of the rain event and the day after the water inside the boom was moderately milky. Two days after the rain event the water inside of the boom was clear.

The turbidity is a measure that includes particles of organic material including coliform both fecal and total.

To insure that biodegradation of organic material occurs during a significant rain event, the flow rate through a filter curtain is kept to no more than one cubic foot of water per square foot of filter curtain enclosing the entrance basin. The filter area of the boom described above is substantially 14,000 square feet. It was initially designed to basically permit twice the flow rate that would occur during a twenty-five year rain event. This was 8021 cubic feet per minute. However, it was most convenient and expeditious to anchor the boom on land points such as exemplified at L1 and L2 in FIG. 1. Therefore, the area of the filter curtain was increased in view of the land anchor points.

The entrance basin was as shown at EB1 in FIG. 1, with two points of land L1 and L2 extending into the reservoir The specified flow rate of no more than one cubic foot per minute per square foot of filter area takes into account the pressure that is exerted on the filter curtain by the entering storm water. As previously mentioned, the filter curtain 12 is a non-woven geosynthetic fabric having openings, by particle size analysis, of twenty microns. If larger flow rates than that specified occur, it indicates that the water pressure on the filter curtain is increased. This could tend to force larger than twenty micron particle through the opening or cause the larger than twenty micron particles to become clogged in the openings.

In designing the boom, the area in the water is specified to be of sufficient area to pass the expected water flow at a rate no greater than one cubic foot per minute per square foot of filter curtain area in view of the expected discharge rate of water into the entrance basin. This calculation is made on the basis of a twenty-five year storm and doubled. It will be appreciated that the exact match of numbers may not occur. In fact it will be unusual if an exact match occurs taking into consideration the availability and location of land anchoring points, the bathymetric survey and the discharge rate of water into an entrance basin. This flow rate through the filter also prevents clogging of the filter curtain by inorganic particulate matter as well as organic particulate matter. The flow rate is a function of the water pressure behind the curtain. Higher water pressure will cause particulate matter to be held to the curtain.

The advantage of having the biodegradation of organic material occur rapidly is that the microorganisms cease to exist and will present no danger to the reservoir within a couple of days. Moreover, this phenomenon keeps organic particles from possibly clogging the filter curtain.

The boom discussed above was initially calculated to have a filter curtain 12 area of 8020 square feet. The rate of discharge of storm water into the entrance basin was known to be 30,000 gallons per minute during a twenty five year storm. Doubling this discharge and dividing by square feet per gallon gave a design discharge of 8021 cubic feet per minute.

In view of the unusual twelve inch rain event that took place after installation of the boom, it was fortunate that the actual filter area was larger than the initial design. Otherwise the boom may have failed. The volumetric discharge rate into the entrance basin EB1 was sufficiently large to cause some movement of the anchor piers.

The limitation on the volumetric flow rate through the filter curtain is also a guide for the restraining force (weight of anchors) exerted on the boom. The total restraining force should be the weight in pounds equal to the filtration area in square feet doubled. Thus, if the filter curtain presented an area of 20,000 square feet, the retraining force exerted at the anchoring points should be 40,000 pounds.

The limitation of the volumetric flow rate through the filter curtain prevents clogging of the filter curtain by particulate matter, yet permits the build-up and concentration of particulate organic matter to occur, as shown by the four examples stated above.

The action of the microorganisms in reducing the biodegradable organic matter on the filter curtain during and after a significant rain event is further advantageous in that the filter curtain is essentially self cleaning immediately after a significant rain event.

What is claimed is:

1. A method of reducing the bacteria count in a water reservoir which is subject to pollution due to entrance of water at a water entrance using an aquatic boom which comprises upper floatation elements supporting a filter curtain depending full water column to the water bed floor and weighted thereon where the boom defines a water entrance basin, which comprises the steps of
   a. identifying a water entrance to the reservoir,
   b. determining the volumetric rate of water which will enter the reservoir at the identified water entrance during a rainfall of twenty-five year intensity,
   c. calculating the area of a filter curtain of one or more sheets of filter material about the identified water entrance to pass no more than one cubic foot of water per minute per square foot of filter area from the defined entrance basin when the determined volumetric rate of water flow at the water entrance is that produced by rain event of twenty-five year intensity doubled
   d. determining the water depth contour of the bottom of the reservoir when the reservoir is full along a path that will accommodate a boom with filter curtain of the calculated filter curtain area or greater and the length of the path, e. preparing a boom with filter curtain to the calculated area, length and depth contour which will define a water entrance basin, f. placing anchors on or in the water bed floor substantially along the entrance basin to be formed, and g. installing the boom and curtain in the reservoir, securing the boom to the anchor piers with the anchor piers on the water entrance side of the boom and securing the ends of the boom to land points to define the water entrance basin, h. said curtain comprising a non-woven geosynthetic fabric having openings therein of substantially twenty microns, by particle size analysis, to trap particulate biodegradable organic materials in sufficient quantity during a significant rain event to cause increased microbial density which accelerates biodegradation whereby microorganisms on the trapped biodegradable particles will feed upon and decompose the biodegradable organic materials, deplete the organic material and perish.

2. The method of claim 1 wherein said anchors are chosen to exert a restraining force on said boom at least equal in pounds to the square foot area of said filter curtain.

3. The method of claim 2 wherein said anchors exert a restraining force in pounds on said boom substantially twice as great as the square foot area of said filter curtain.

4. The method of claim 2 including the further step of installing additional anchors on the other side of the boom with the bottom of the filter curtain substantially midway between said anchors and said additional anchors.

5. Apparatus for use in a reservoir to aid in prevention of entrance of bacteria into the main body of the reservoir at a water entrance to the reservoir during a rain event, comprising an aquatic boom disposed in the reservoir about the water entrance and defining an entrance basin into which rain event water flows, said apparatus comprising an aquatic boom having ends anchored to land points, said aquatic boom comprising an upper flotation member having a filter curtain of non-woven geosynthetic material extending full water column to the water bed floor of the reservoir and having ballast along its lower edge to maintain a full curtain about the water entrance, anchors on the floor of the reservoir within the defined entrance basin, restraining means connecting said filter curtain to said anchors, said filter curtain having openings therein of substantially twenty microns as determined by particle size analysis, said filter curtain being sized in length to provide a filtration area which will pass no more than one cubic foot per minute of water from the entrance basin considering the volume of water which will enter the entrance basin during a rain event of twenty-five year severity doubled, said anchors exerting a restraining force on said aquatic boom which in pounds is at least equal to the square foot area of the filtration area of said curtain.

6. The apparatus of claim 5 wherein additional anchors are provided on or in the water bed floor on the side of said boom outside of the water entrance basin and being positioned substantially opposite said anchors whereby said ballast of said filter current is substantially midway between said anchors and said additional anchors.

7. The apparatus of claim 6 wherein the restraining force exerted by said anchors in pounds is substantially double or greater than the filtration area of said filter curtain in square feet.

8. The apparatus of claim 7 wherein the restraining force of said additional anchors is substantially one half that of said anchors.

9. The apparatus of claim 6 wherein the restraining force of said additional anchors is substantially one half that of said anchors.

10. A method of reducing the bacteria count in a body of water which is subject to pollution due to entrance of water at a water entrance using an aquatic boom which comprises upper floatation elements supporting a filter curtain depending full water column to the water bed floor and weighted thereon and where the boom will define a water entrance basin, which comprises the steps of a. identifying a water entrance to the body of water, b. determining the volumetric rate of water which will enter the body of water at the identified water entrance during a rainfall of twenty-five year intensity, c. calculating the area of a filter curtain of one or more sheets of filter material to be installed about the identified water entrance to pass no more than one cubic foot of water per minute per square foot of filter area from the defined entrance basin when the determined volumetric rate of water flow at the water entrance is that produced by a rain event of twenty-five intensity, d. determining the water depth contour of the bottom of the body of water when the body of water is full along a path that will accommodate a boom with filter curtain of the calculated filter curtain area or greater and the length of the path, e. preparing a boom with filter curtain to the calculated area, length and depth contour which will define a water entrance basin, f. placing anchors on or in the water bed floor substantially along the entrance basin to be formed, and g. installing the boom and curtain in the body of water, securing the boom to the anchors with the anchors on the water entrance side of the boom and securing the ends of the boom to land points to define the water entrance basin h. said curtain comprising a non-woven geosynthetic fabric having openings therein of substantially twenty microns, by particle size analysis, to trap particulate biodegradable organic materials in sufficient quantity during a significant rain event to cause increased microbial density which accelerates biodegradation of the biodegradable organic materials.

11. The method of claim 10 wherein said anchors are chosen to exert a restraining force on said boom at least equal in pounds to the square foot area of said filter curtain.

12. The method of claim 11 wherein said anchors exert a restraining force in pounds on said boom substantially twice as great as the square foot area of the filter curtain.

13. The method of claim 11 including the further step of installing additional anchors on the other side of the boom with the bottom of the filter curtain substantially midway between said anchors and said additional anchors.

14. Apparatus to be used in a body of water to aid in prevention of entrance of bacteria into the main body of the reservoir at a water entrance to the body of water during a rain event, comprising an aquatic boom disposed in the body of water about the water entrance and defining an entrance basin into which rain event water flows, said apparatus comprising an aquatic boom having ends anchored to land points, said aquatic boom comprising an upper flotation member having a filter curtain of non-woven geosynthetic material extending full water column to the water bed floor of the reservoir and having ballast along its lower edge to maintain a full curtain about the water entrance, anchors on or in the floor of the body of water within the defined entrance basin, restraining means connecting said filter curtain to said anchor, said filter curtain having openings therein of substantially twenty microns as determined by particle size analysis, said filter curtain being sized in length to provide a filtration area which will pass no more than one cubic foot per minute of water from the entrance basin considering the volume of water which will enter the entrance basin during a rain event of twenty-five year intensity, said anchors exerting a restraining force on said aquatic boom which in pounds is at least equal to the square foot area of the filtration area of said curtain.

15. The apparatus of claim 14 wherein additional anchors are provided on the water bed floor on the side of said boom outside of the water entrance basin and being positioned substantially opposite said anchors whereby said ballast of said filter current is substantially midway between said anchors and said additional anchors.

16. The apparatus of claim 15 wherein the restraining force exerted by said anchors piers in pounds is substantially double the filtration area of said filter curtain in square feet.

17. The apparatus of claim 16 wherein the retraining force of said additional anchors is substantially one half that of said anchors.

18. The apparatus of claim 15 wherein the retraining force of said additional anchors is substantially one half that of said anchors.

* * * * *